April 2, 1929. L. S. YOUNGGREN ET AL 1,707,650
COMBINATION DRILL AND CULTIVATOR
Filed Dec. 29, 1926

Inventors.
Leonard Severson Younggren
Franz Younggren

Patented Apr. 2, 1929.

1,707,650

UNITED STATES PATENT OFFICE.

LEONARD SEVENSON YOUNGGREN AND FRANZ YOUNGGREN, OF KINMUNDY, ALBERTA, CANADA; SAID FRANZ YOUNGGREN ASSIGNOR TO SAID LEONARD SEVENSON YOUNGGREN.

COMBINATION DRILL AND CULTIVATOR.

Application filed December 29, 1926, Serial No. 157,776, and in Canada July 13, 1926.

Our invention relates to a cultivator combination which may be used as a cultivator unit, or may be used in combination with a seed drill, or may be used in combination with any standard make of drill as additional cultivating means. The peculiar arrangement of the cultivator parts will also act as weed destroyers.

In seeding land that portion where the seed is actually planted is generally the only portion which is cultivated, the space between the rows not being disturbed at all. In our device the whole area of the ground is cultivated and the weeds removed during seeding operations which helps very considerably to reduce the crop of weeds which would otherwise be actually left growing between the rows of seeds. By adding our device to any standard make of seed drill, the ground between the rows is cultivated and the seed is adequately covered up.

In the drawings Fig. 1, is a side elevation showing the cultivator arrangement;

Similar characters refer to similar parts throughout the several views.

Figure 1:
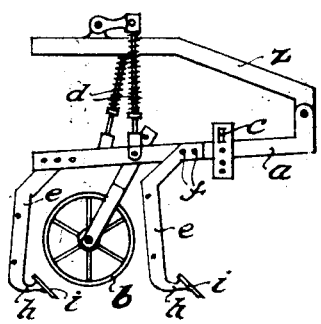
Figure 2:
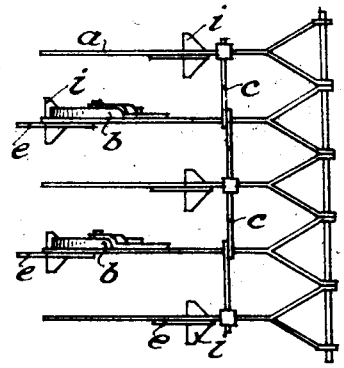
Fig. 2, is a plan showing the cultivator arrangement.
Figure 3:
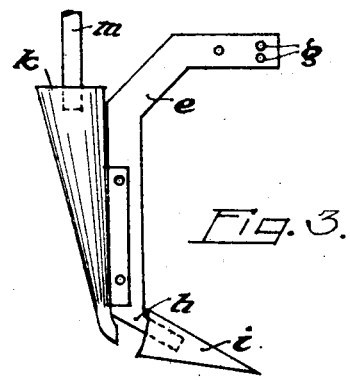
Fig. 3, is an elevation showing the manner in which a seed tube and shoe of a drill would be secured to the standards carrying the duck feet.
Figure 4:
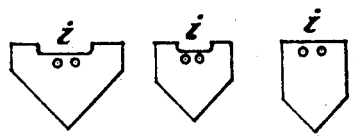
Fig. 4, shows in detail the various types of feet usable with this combination apparatus.

In applying our device for use as a cultivator beams $a$ are pivoted to hangers on the front of a frame $z$, the beams being free to move up or down within a restricted range. A small wheel $b$ mounted on alternate beams, and a series of supports $c$ mounted on beams not provided with wheels but resting on the beams provided with wheels, limit the downward movement of the cultivator feet, and suitably controlled push rods press them into the ground. Upon beams $a$, standards $e$, are mounted by means of bolts $f$, the positioning of these standards being variable through the provision of bolt holes at intervals along the beams. The forward ends of the standards are fitted with a series of bolt holes $g$, so that the angle of the standard in relation to the beam may be varied. The standards $e$ project downwards and forward and to the bottoms of same, $h$, are fastened the duck foot shoes $i$ which are adapted to travel under the surface of the earth.

To convert this into a drill, tubes $k$, with feet thereon are bolted to the straight portions of the standards $e$, the seed being delivered thereto by tubes $m$, from a suitably mounted seed box.

What we claim is:

An apparatus of the class described comprising a series of beams adapted to be pivoted to the front member of a frame, downwardly projecting standards adjustably hung upon the said beams, cultivator shoes securely mounted upon the lower end of the said standards, a supporting wheel adjustably mounted upon every alternate beam, supporting rods securely mounted upon those remaining beams not provided with wheel supports projecting transversely across the beams to receive support from the wheeled beams, adjustable pressure rods mounted upon the frame and connected to the said beam.

Atlee, Alberta, 18th November, 1926.

LEONARD SEVENSON YOUNGGREN.
FRANZ YOUNGGREN.